Figure 1:
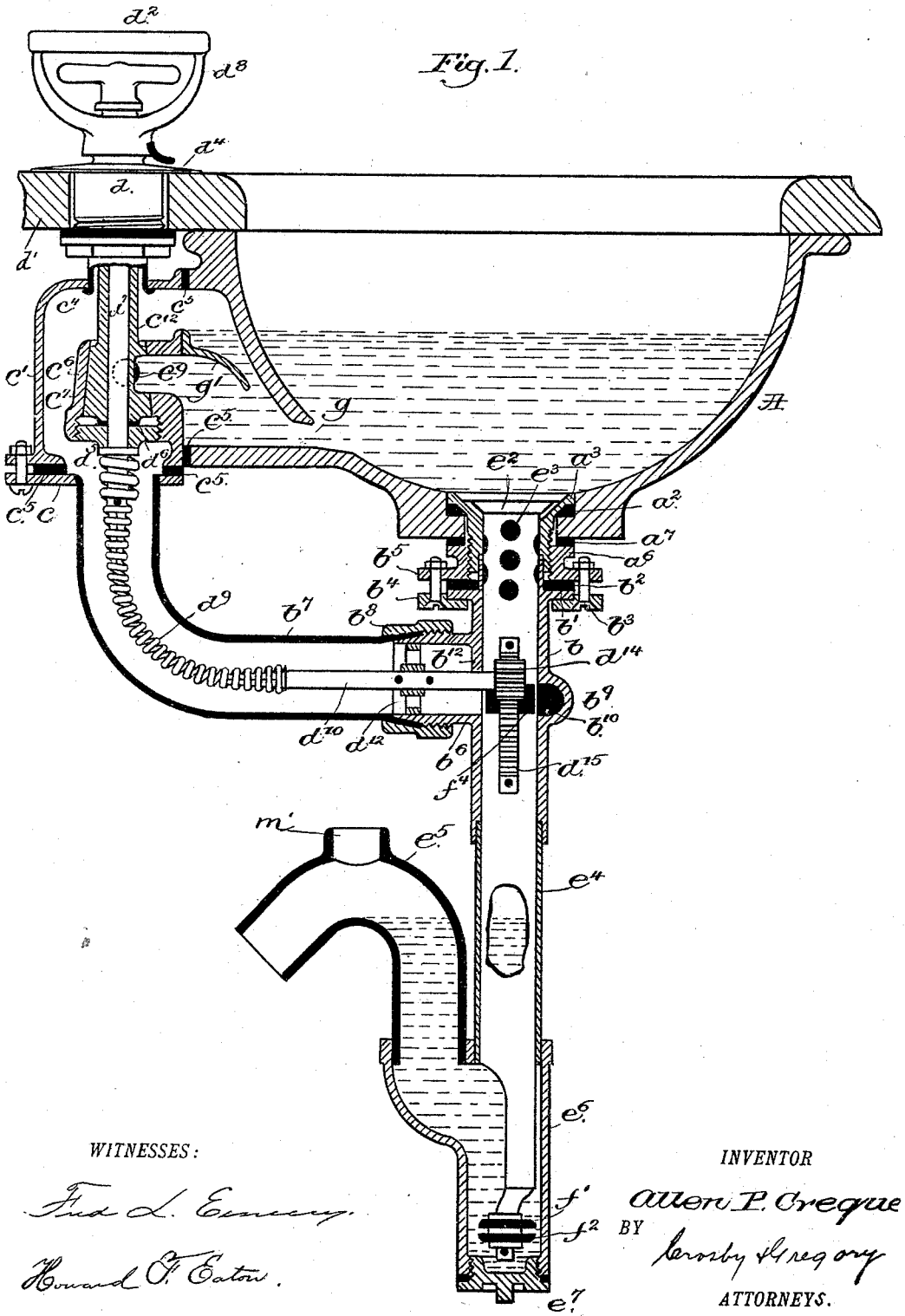

(No Model.) 6 Sheets—Sheet 1.

A. P. CREQUE.
WASH BOWL.

No. 492,192. Patented Feb. 21, 1893.

WITNESSES:
Fred L. Emery.
Howard F. Eaton.

INVENTOR
Allen P. Creque
BY Crosby & Gregory
ATTORNEYS.

(No Model.)  6 Sheets—Sheet 4.
A. P. CREQUE.
WASH BOWL.

No. 492,192.  Patented Feb. 21, 1893.

WITNESSES:  INVENTOR
Allen P. Creque.
BY
ATTORNEYS (No Model.) 6 Sheets—Sheet 5.
A. P. CREQUE.
WASH BOWL.
No. 492,192. Patented Feb. 21, 1893.
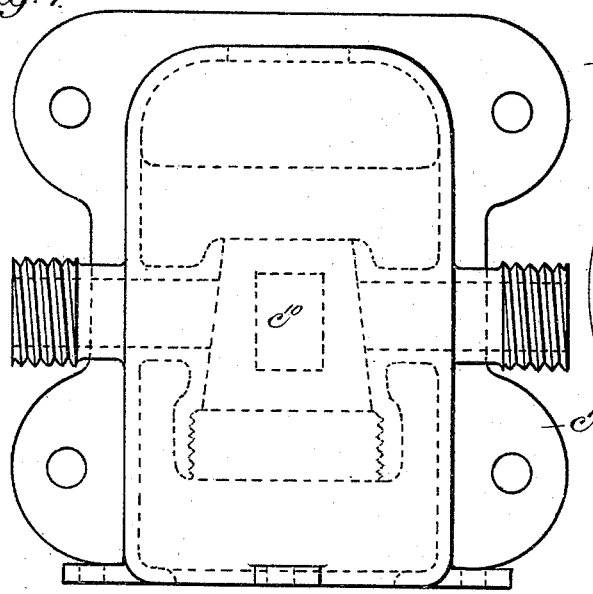
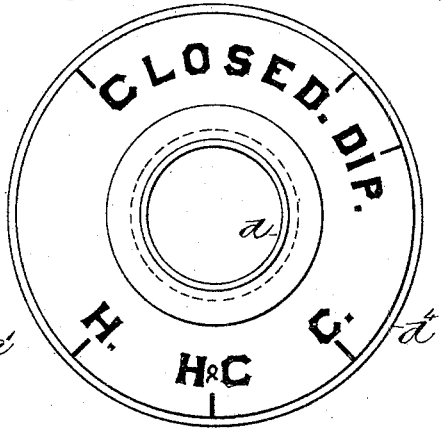
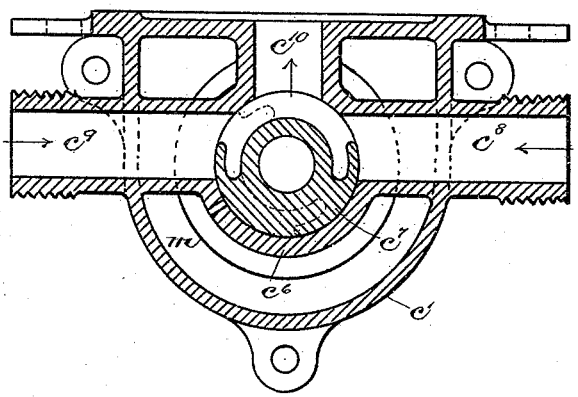
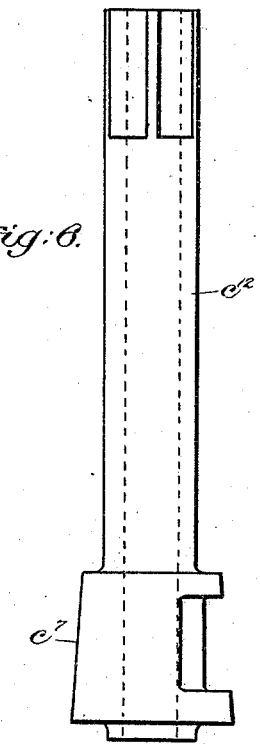
WITNESSES:
Howard F. Eaton
John F. C. Prinslert
INVENTOR
Allen P. Creque.
BY
Crosby & Gregory
ATTORNEYS (No Model.) 6 Sheets—Sheet 6.
A. P. CREQUE.
WASH BOWL.
No. 492,192. Patented Feb. 21, 1893.
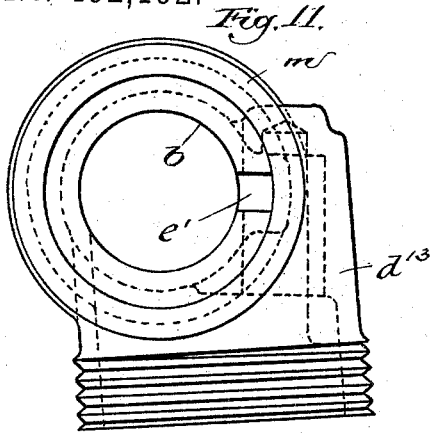
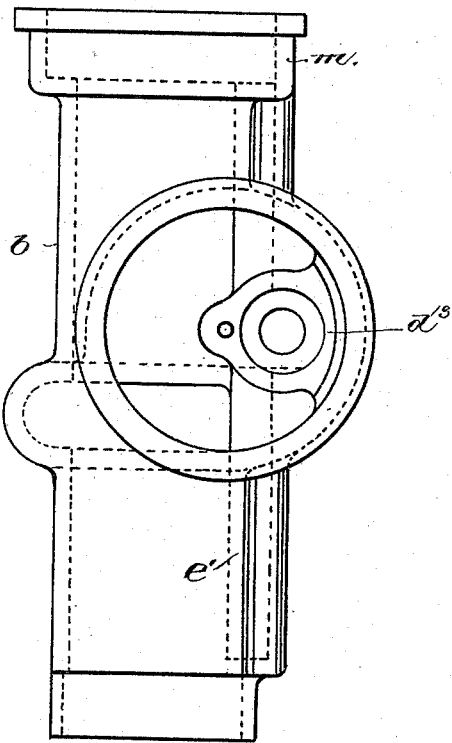
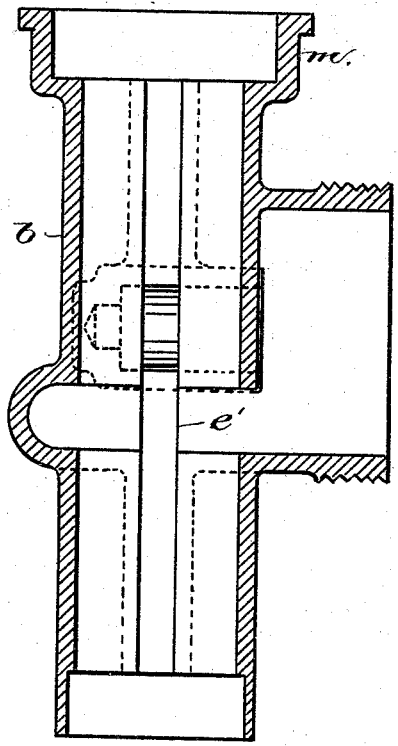
WITNESSES:
Howard F. Eaton.
John F. C. Prinkert
INVENTOR
Allen P. Creque,
BY
Crosby & Gregory
ATTORNEYS

UNITED STATES PATENT OFFICE.

ALLEN P. CREQUE, OF NEW YORK, N. Y.

WASHBOWL.

SPECIFICATION forming part of Letters Patent No. 492,192, dated February 21, 1893.

Application filed June 28, 1887. Serial No. 242,708. (No model.)

*To all whom it may concern:*

Be it known that I, ALLEN P. CREQUE, of New York, county and State of New York, have invented an Improvement in Wash-bowls, of which the following description, in connection with the accompanying drawings, is a specification, like letters on the drawings representing like parts.

My invention relating to lavatory apparatus, such for instance as wash-bowls, bath tubs, &c., is hereinafter specifically described with relation to a wash-bowl.

Wash-bowls have heretofore been provided with an independent hot and cold water faucet, located above the bowl so as to discharge water into the said bowl from above, the outlet of the said bowl being closed, when the bowl is to be filled, by a cap or plug generally attached to a chain fastened usually to a chain stay located above.

One object of this invention is to dispense with the independent faucets above the bowl. To do this practically, I provide the washbowl with an auxiliary chamber communicating with the bottom portion of the said bowl and with the overflow pipe, the said chamber containing a valve casing preferably having a hot and cold water inlet and a discharge or outlet passage controlled by a valve, preferably having a hollow stem which is extended above the bowl, where it is provided with a handle having a pointer to register with a suitable dial, and clamped preferably to the slab above the bowl, the pointer and dial indicating in which direction to turn the said handle when it is desired to fill the bowl with hot or cold water, or a mixture of both, or to shut off the flow of water into the bowl.

Another feature of my invention consists in dispensing with the usual cap or plug by which the outlet of the wash-bowl is closed when it is desired to fill the said bowl, the said cap or plug being now commonly attached by a chain to a chain stay located above the bowl. This feature of my invention I accomplish by means of a tube or pipe adapted to be inserted into the outlet pipe of the bowl, the said tube or pipe having at its inner end a cap adapted to lie flush with the interior of the bowl, thus preventing exit of water in the bowl through the outlet pipe when the said tube is in its normal position.

The tube referred to, to be hereinafter designated by me as the discharge tube, has at its upper end below the cap thereon, one or more parts or openings through which water in the bowl may find an exit when the discharge tube is preferably but slightly elevated out of the outlet pipe.

The discharge tube is elevated from its normal position to permit the escape of water from the bowl preferably by mechanism, herein shown as a pinion engaging a rack at the side of the said discharge tube, the said pinion being on the end of a shaft extended through the lower part of the over-flow pipe, and supported in bearings therein, the said shaft being joined by a preferably steel spiral spring, or a piece of wire extended through the over-flow pipe and fastened to one end of a spindle or shaft passed through the hollow stem of the valve controlling the inlet of water to the bowl, the latter spindle or shaft being extended above the base portion of the handle of the valve referred to, and being provided with a handle by which it may be turned to raise or lower the discharge tube. The discharge tube is herein shown as provided at its lower end with a seal, composed preferably of rubber rings or disks substantially such as shown in my application Serial No. 242,709 filed June 28, 1887, the said seal not being herein claimed broadly.

The particular features in which my invention consists will be pointed out in the claims at the end of this specification.

Figure 2:
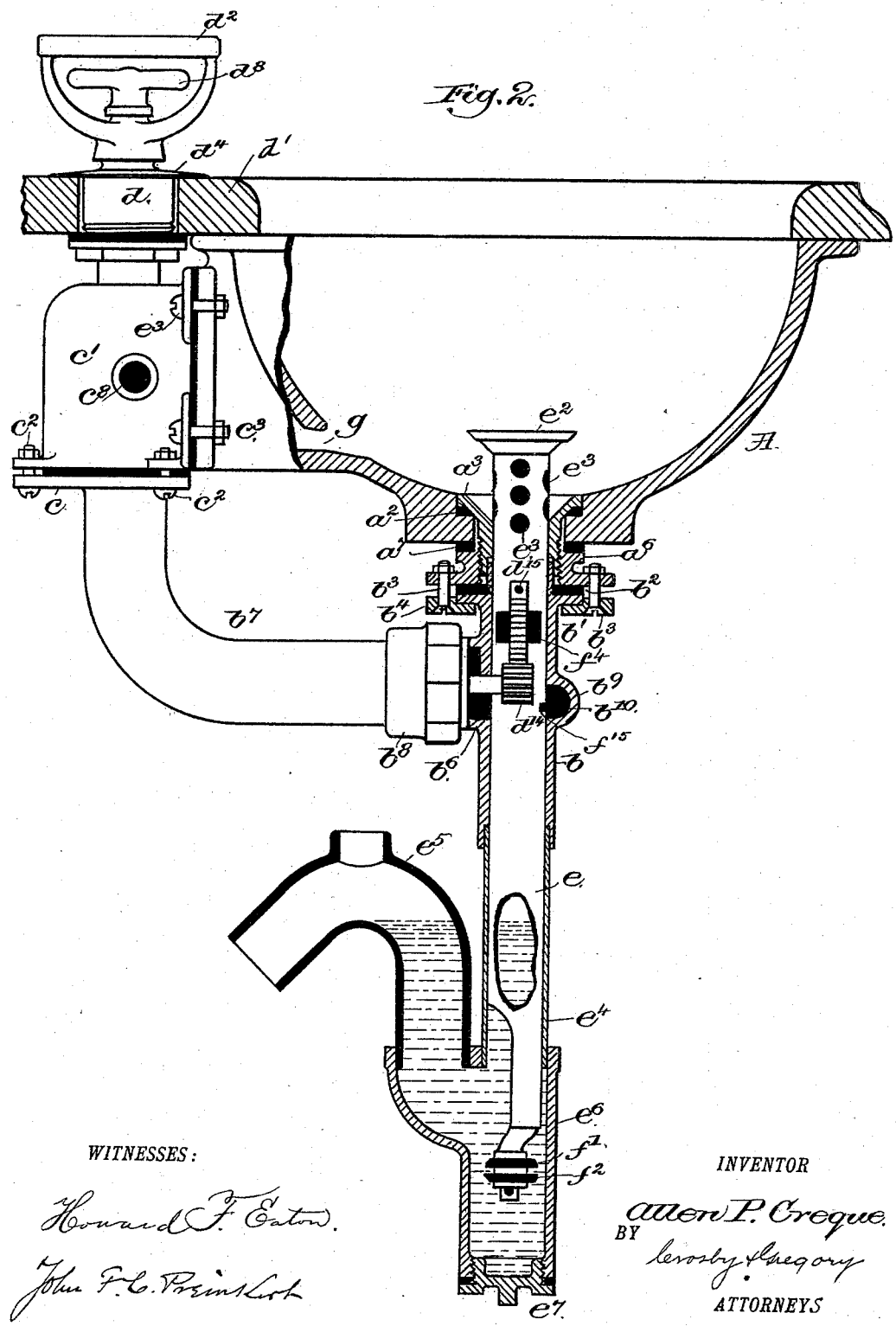
Figure 3:
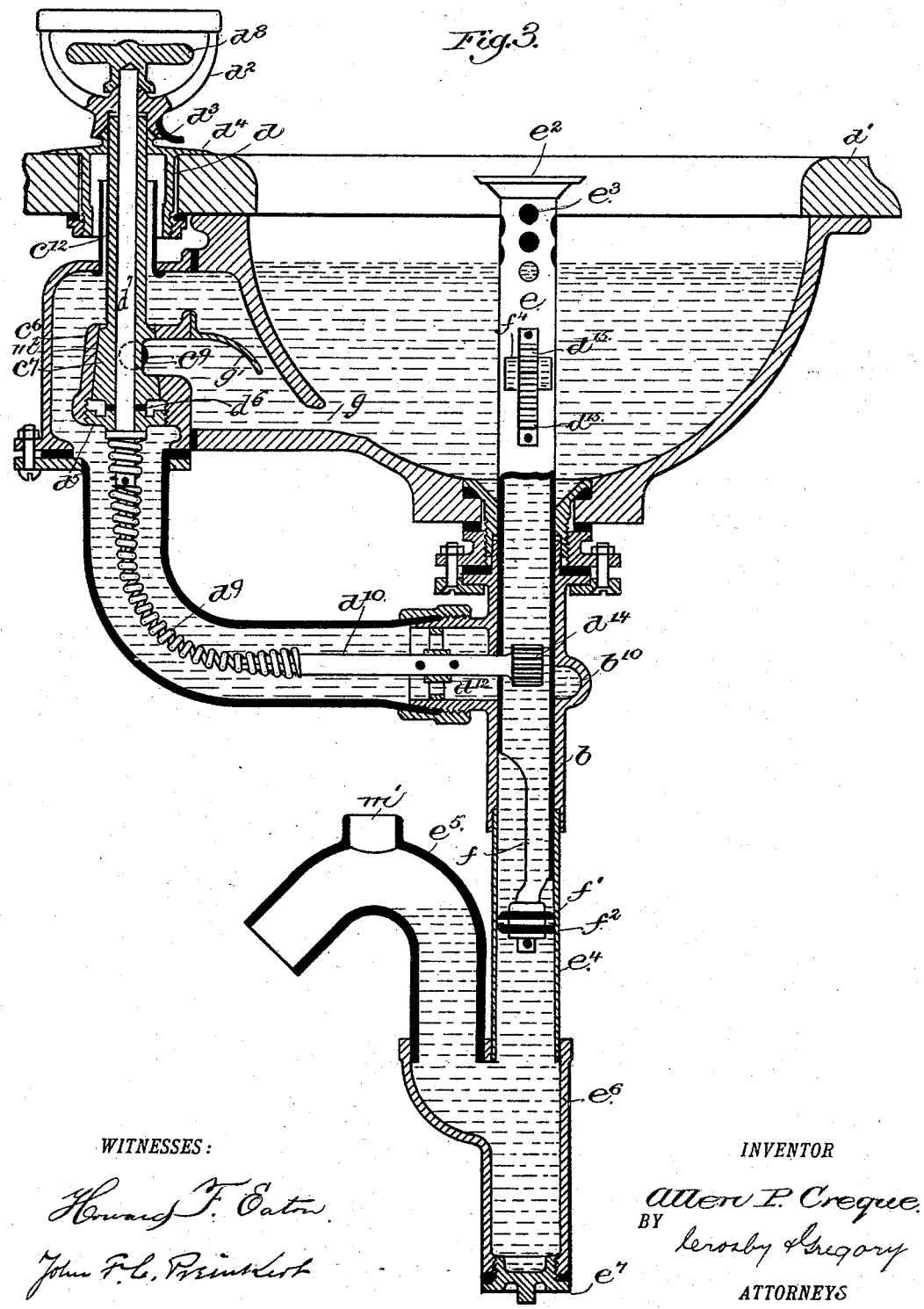
Figure 4:
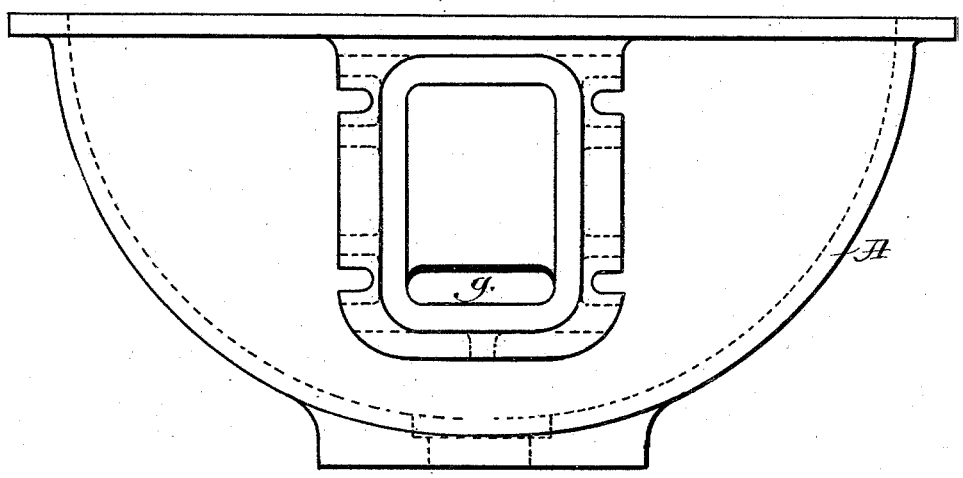
Figure 5:
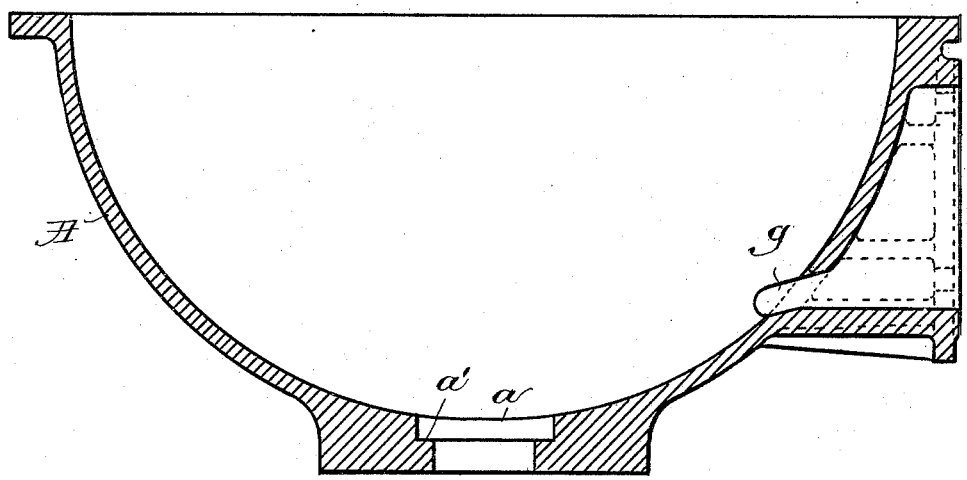

-Figure 1 in section and elevation shows a wash-bowl constructed in accordance with my invention, the discharge tube and the mechanism for operating it being in elevation, the discharge tube being in its normal position with the bowl containing water. Fig. 2 shows the discharge tube partially elevated to afford an outlet for the water in the bowl. Fig. 3 shows the position occupied by the discharge tube at night. Figs. 4 and 5 details showing the construction of the bowl. Figs. 6, 7 and 8 details of the valve and its casing on an enlarged scale. Figs. 9 and 10 modified forms of the pipe section, on an enlarged scale, into which the pinion engaging the rack on the discharge tube is inserted. Fig. 11 a top or plan view of Fig. 10, and Fig. 12. a detail to be referred to.

The bowl A of porcelain or other suitable material has an outlet $a$ made to form a shoulder $a'$, see Fig. 5, upon which rests a packing ring $a^2$, constituting a seat for a nozzle $a^3$ extended through the outlet $a$ and having screw threads to engage a clamping device, herein shown as a ring $a^6$, a packing-ring $a^7$ being interposed between the ring $a^6$, and the base of the bowl A. The nozzle $a^3$ receives within it, the end of a pipe section $b$ having a flange $b'$ between which and the ring $a^6$ is a packing ring $b^2$, the said pipe section being maintained in position by bolts $b^3$ extended through the segment $b^4$ and the flange $b^5$ on the ring $a^6$, all substantially as in my application referred to.

The pipe section $b$ has an angular extension or branch $b^6$ made tapering at its end as herein shown, to be embraced by the end of the pipe $b^7$, the latter being secured to the said branch pipe, as shown, by a threaded collar $b^8$. The pipe section $b$ has an annular bulge or projection $b^9$ forming a passage $b^{10}$, which communicates with and forms an extension of the branch pipe $b^6$, an extension $b^{12}$ of the pipe section $b$ being carried across the branch pipe $b^6$ to leave the outlet of the said branch pipe of substantially the same area in cross section as the passage $b^{10}$, for a purpose to be hereinafter set forth. The pipe $b^7$ is connected at its other end to a plate $c$ upon which rests a casing $c'$, secured as shown by bolts $c^2$, the said casing being also secured to the bowl A by bolts $c^3$, see Fig. 2, the interior of the said casing forming an auxiliary chamber $c^4$ which is rendered water tight by a packing $c^5$ the pipes $b^7$ forming the overflow pipe for the auxiliary chamber. The chamber $c^4$ contains within it a valve casing $c^6$, preferably forming part of the casing $c'$ which is provided preferably with a hot and cold water passage $c^8$, $c^9$, and discharge outlet $c^{10}$, see Fig. 8, the said passages being controlled by a hollow valve $c^7$ having a hollow stem $c^{12}$ extended up through a cap $d$, fitted into a hole in the top slab $d'$ of the bowl, see Fig. 3, the said hollow valve stem having a handle $d^2$ by which the valve may be turned to permit either hot or cold water, or a mixture of both to flow into the bowl A, the said handle having an index or finger $d^3$ to register with graduations on the upper face of the flange $d^4$ of the cap $d$, see Fig. 12. The hollow valve $c^7$ rests upon a plate $d^5$, herein shown as screwed into the valve casing $c^6$, a packing $d^6$ being interposed between the said valve and the cap $d^5$. The hollow valve $c^7$ and its stem $c^{12}$ have extended through them a spindle or rod $d^7$, which is extended up through the base of the handle $d^2$ where it is provided with a handle $d^8$, the other end of the said spindle being extended through the plate $d^5$ and having secured to it one end of a preferably spiral steel spring or spiral shaft $d^9$, the other end of the said spring being fastened to one end of a spindle or shaft $d^{10}$. The shaft $d^{10}$ is supported in suitable bearings $d^{12}$ and is extended into an offset portion $d^{13}$ of the pipe section $b$, best shown in Fig. 10. The shaft $d^{10}$ has mounted on its end in the offset portion $d^{13}$, a pinon $d^{14}$ projecting through an opening into pipe $b$ and adapted to engage a rack $d^{15}$ at one side of the discharge pipe $e$ of the bowl A, the said discharge pipe being made as a tube, the said rack traveling in a groove $e'$ made in the pipe $b$ shown by dotted lines Fig. 10.

The pipe $e$ is fitted into the nozzle $a^3$ and pipe section $b$, so as to be readily removed therefrom if desired. The pipe $e$ at its upper end, is provided with a cap $e^2$ shaped to fit the nozzle $a^3$ when the pipe $e$ is in its normal position to enable the bowl to be filled, see Fig. 1. The pipe $e$, below the cap $e^2$, has one or more ports or openings $e^3$ through which water in the bowl is permitted to escape when the pipe $e$ is drawn slightly above the bottom of the bowl, as shown in Fig. 2, the water passing through the ports $e^3$ into the pipe $e$ and thence as shown into the trap formed by the pipes $e^4$, $e^5$, fitted into the pipe $e^6$, the latter having the removable plug or cap $e^7$, the said trap being of any ordinary construction. The pipe $e$, open at its lower end, has one side $f$ extended as shown, and provided at its lower end with a seal composed preferably of rubber disk or rings $f'$, $f^2$, substantially as in my application referred to. The pipe $e$ is further provided with an opening $f^4$ located, as shown, behind the rack $d^{15}$, so as to register with the passage $b^{10}$ when the pipe is in its normal position, or as shown in Fig. 1.

When it is desired to use the wash-bowl, the discharge pipe $e$ is pushed down into its normal position Fig. 1, and the operator then turns the handle $d^2$ until the index or finger $d^3$ registers with the desired graduation on the flange $d^4$, that is with "H" if hot water be desired, "C" if cold, or "H & C" if a mixture. With the index or finger over "H & C" the valve $c^7$ occupies the position shown in Fig. 8, both the hot and cold water passages being in communication with the outlet passage $c^{10}$.

Water is admitted into the bowl herein shown through the passage $g$ until it is on a level with the top of the dam $g'$, herein shown as secured to the casing $c$. With the discharge tube in its normal position shown in Fig. 1, the water is prevented from rising in the bowl beyond the height of the dam $g'$, as shown in said figure, and if water be permitted to flow after the water in the bowl has reached the level of the top of the dam $g'$, the excess or surplus flows over the dam, through the chamber $c^4$ into the over-flow pipe $b^7$, from whence it flows around the discharge pipe $e$ by the passage $b^{10}$ and into the discharge pipe $e$ through the opening or port $f^4$, it flowing from the said pipe into the pipe $e^5$ connected with the waste pipe.

If it is desired to empty the bowl, the operator turns the handle $d^8$ to rotate the pinion $d^{14}$ in the direction to elevate the discharge pipe through the rack $d^{15}$, the said handle being turned until the discharge pipe occupies the position shown in Fig. 2, the water in the bowl being then free to escape through the ports or openings $e^3$.

At night time it is desirable to place an impassible barrier or seal in the outlet pipe below the over flow pipe and also to fill the basin and over flow pipe with water to prevent sewer gas being admitted to the house. To accomplish this result the discharge pipe is drawn up into the position shown in Fig. 3. The disks $f, f^2$ forming the barrier or seal being at such time below the overflow pipe, but above the outlet of the pipe $e^4$, so that the pipe $e^4$ is rendered gas tight, whereby sewer gas is prevented from escaping into the house and the water in the trap and bowl and overflow pipe is prevented from being drawn off.

By causing the water in the bowl to be discharged through the pipe $e$, the pipe section $b$ is prevented from becoming coated or lined with filth or grease, and if any grease or filth should find a lodgment between the tube or pipe $e$ and the inner wall of the pipe section $b$, then the said filth or grease may be removed by working the discharge pipe up and down in the said pipe section.

Referring to Figs. 9, 10, and 11, the pipe section $b$ is shown with an enlarged flange $m$ at its upper end into which the nozzle $a^3$ may be extended.

To prevent the trap from being emptied of its water by evaporation, in case the bowl is left unused for a considerable length of time, the casing $c^6$ is provided with a vent or drip passage $m^2$, see Fig. 3, through which water may be allowed to drip drop by drop, if desired, into the over-flow pipe, thus replacing any water which might be lost by evaporation, the handle $d^2$ being turned to connect the water inlet passage with the drip passage or vent $m^2$. This feature is especially advantageous when a house is shut up and vacated for a long time as in the summer months.

I claim—

1. A water-receiving vessel having a single outlet passage for the escape of waste-water and sediment, an auxiliary chamber, a water supply duct connecting said chamber to said vessel, a water supply valve communicating with said vessel through said chamber and said duct, a dam in said chamber communicating with said outlet passage and automatically diverting the flow of water from the said chamber into the said outlet passage whenever the water attains a predetermined height in said vessel, the said outlet passage and the water supplying devices being separated one from the other, and the discharge orifice of the said supply duct being located upon a different level from that of the receiving aperture of the said outlet passage, so that the waste-water and sediment are wholly excluded from the water-supplying devices, substantially as described.

2. In a lavatory apparatus, a vessel or receptacle having a water outlet, an auxiliary chamber communicating with the bottom of the said vessel, an over-flow pipe connecting said chamber with the said outlet passage, a valve casing in said chamber provided with water inlet and outlet passages, a valve in said casing to control the said inlet and outlet passages, a tube or pipe adapted to be inserted into the outlet passage of the said vessel and provided with a port or opening near its upper end, a rack on said tube, combined with a pinion to engage the rack on the said tube and with means, substantially as described, to operate the said pinion, as and for the purpose specified.

3. A vessel or receptacle having an outlet passage, an auxiliary chamber communicating with the bottom of the said vessel, an overflow pipe connecting said chamber with the said outlet passage, a valve casing in said chamber provided with water inlet and outlet passages, a valve in said casing to control the said inlet and outlet passages, a tube or pipe adapted to be inserted into the outlet passage of the said vessel, and provided with a port or opening near its upper end, and with a sealing device near the lower extremity of said tube, a rack on said tube, combined with a pinion to engage the rack on the said tube, and with means, substantially as described, to operate the said pinion, as and for the purpose specified.

4. A vessel or receptacle having its outlet passage controlled by a movable discharge pipe $e$, an auxiliary chamber communicating with the said vessel, a valve casing having hot and cold water inlets and an outlet passage, a hollow valve to control said passages, and having a hollow stem extended above the top of the said vessel, a handle to operate said valve, combined with a spindle $d^7$ extended through the hollow valve and stem and operatively connected with the discharge pipe, as and for the purpose specified.

5. In a lavatory apparatus, a vessel A, an outlet pipe therefor, a pipe section $b$ communicating with said outlet passage and having an enlargement to form a passage as $b^{10}$, an auxiliary chamber and an overflow pipe connecting said auxiliary chamber with the said outlet passage, a discharge pipe $e$ normally communicating with the passage $b^{10}$, and a rack $d^{15}$, combined with a pinion to engage said rack, and with means substantially as described extended through the overflow pipe and auxiliary chamber to operate said pinion to raise and lower the discharge pipe, substantially as specified.

6. In a lavatory apparatus, a vessel or receptacle having a water outlet, a removable discharge pipe as $e$, adapted to be inserted into said outlet and closed at its upper end to close the outlet to the said vessel, a port or opening $e^3$ below the closed end in substantially close proximity thereto, combined with a pipe communicating with the outlet passage of the vessel, and with a discharge pipe elevating mechanism extended through said pipe, substantially as and for the purpose specified.

7. In a lavatory apparatus, a vessel or receptacle having an outlet passage, a removable discharge tube as $e$, adapted to be inserted in the outlet passage, and closed at its upper end to form a plug for the outlet passage, and a sealing device connected to the lower end of the said tube to seal or close the outlet passage below the basin, substantially as described.

8. In a lavatory apparatus, a water outlet, a pipe section $b$ having an enlargement to form a passage $b^{10}$ constituting a continuation of the water outlet, a discharge pipe $e$ provided with a port $e^3$ near its upper end and with a port $f^4$ normally communicating with the passage $b^{10}$, and a rack $d^{15}$, combined with a pinion to engage said rack, a handle located at the top of the said apparatus, and with means substantially as described, to operatively connect the said handle and pinion, as and for the purpose specified.

9. In a lavatory apparatus a vessel or receptacle provided with a water outlet, an auxiliary chamber communicating with the said apparatus, below the top or surface and constituting an inlet for the said vessel and an over-flow pipe connecting the said chamber with the water outlet of the apparatus, combined with a valve casing located in said chamber and having hot and cold water inlet and outlet passages, and provided with a dam, and with a valve to control said passages, substantially as described.

10. A vessel or receptacle having a discharge pipe connected thereto, an auxiliary chamber communicating with the bottom of the said vessel and with the said discharge pipe, a valve casing in said chamber provided with water inlet and outlet passages, a valve in said casing to control the said inlet and outlet passages, a tube or pipe having a port or opening, a rack on said tube, combined with a pinion to engage the rack, and with means to operate the said pinion, whereby the said tube may be placed in communication with the over-flow of the said auxiliary chamber, substantially as described.

11. In a lavatory apparatus, a vessel or receptacle provided with a water outlet, an auxiliary chamber communicating with the said apparatus below the top or surface and constituting an inlet for the said vessel, and an over-flow pipe connecting the said chamber with the water outlet of the apparatus, combined with a valve casing located in the said chamber and having a water inlet and outlet orifice, a valve in said casing to control said orifices, and a dam in said chamber to prevent the water in the apparatus from reaching above a predetermined height, substantially as described.

12. A vessel or receptacle having its outlet passage controlled by a movable pipe, an auxiliary chamber communicating with the said vessel, a valve casing having a water inlet and outlet passage, a hollow valve stem extended above the top of the said vessel, a handle to operate said valve, combined with a spindle extended through the hollow stem and valve and connected to the said movable pipe, substantially as described.

In testimony whereof I have signed my name to this specification in the presence of two subscribing witnesses.

ALLEN P. CREQUE.

Witnesses:
JAS. H. CHURCHILL,
B. DEWAR.